No. 686,616. Patented Nov. 12, 1901.
R. N. JOHNQUEST.
APPARATUS FOR TESTING THE STRENGTH AND RELATIVE ACTION OF THE EXTRANEOUS MUSCLES OF THE EYES.
(Application filed Oct. 12, 1899.)
(No Model.) 2 Sheets—Sheet 1.
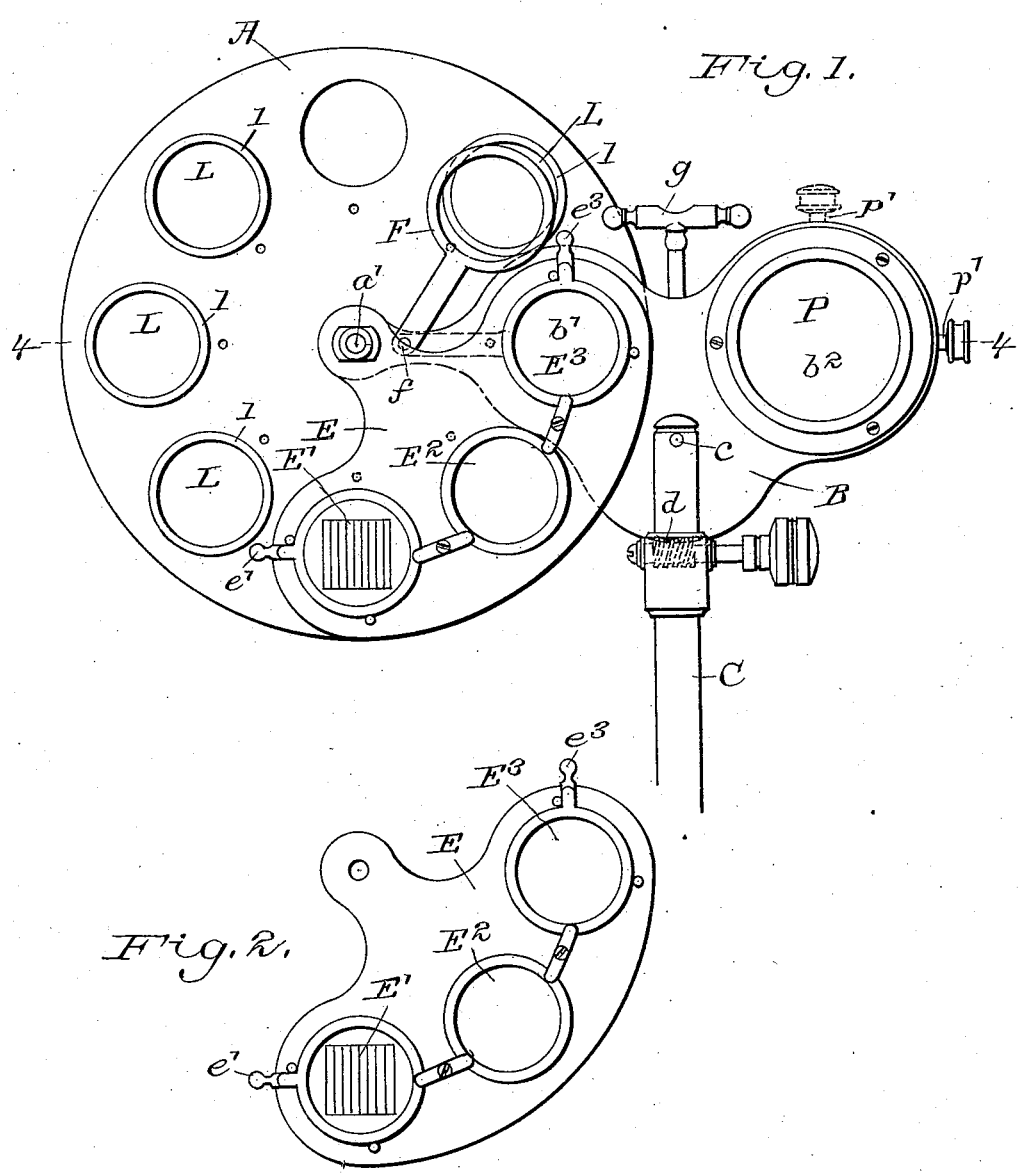

No. 686,616. Patented Nov. 12, 1901.
R. N. JOHNQUEST.
APPARATUS FOR TESTING THE STRENGTH AND RELATIVE ACTION OF THE EXTRANEOUS MUSCLES OF THE EYES.
(Application filed Oct. 12, 1899.)
(No Model.) 2 Sheets—Sheet 2.
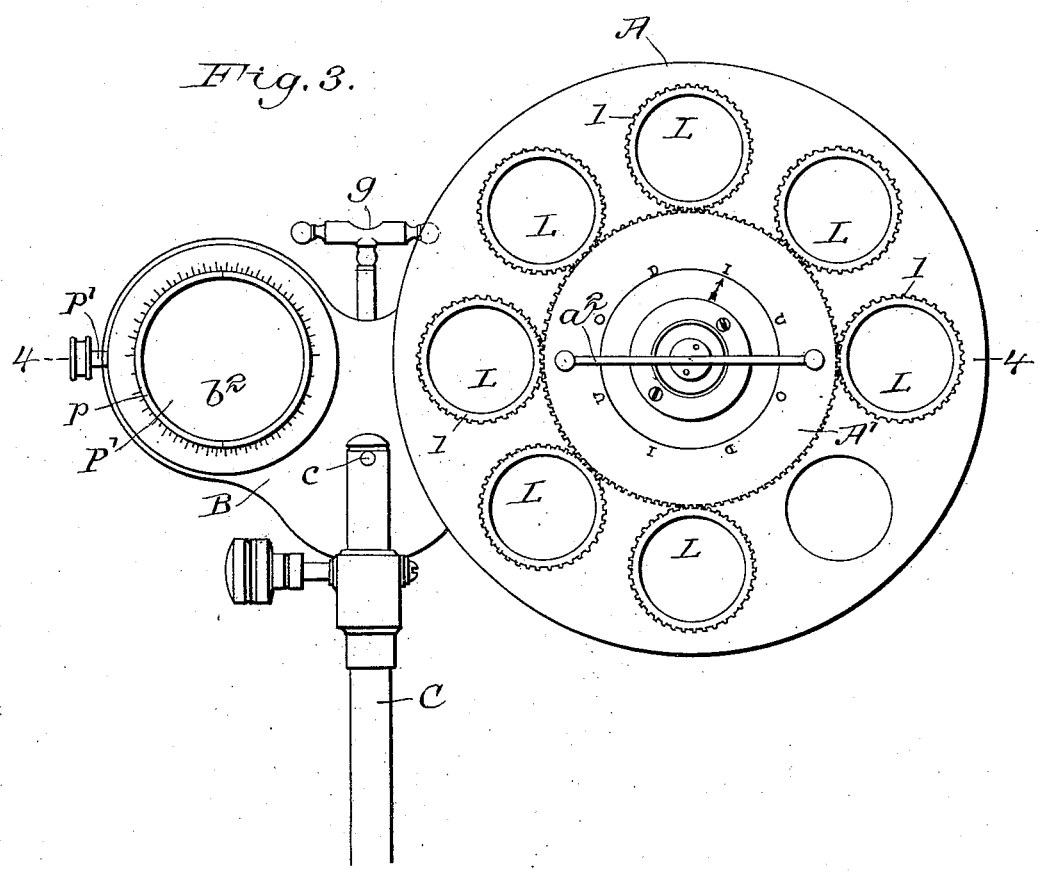
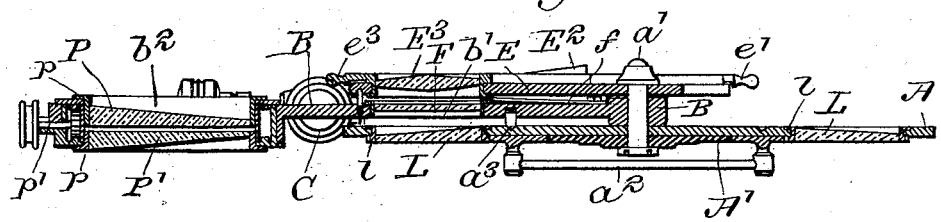
WITNESSES:
INVENTOR
Rudolph N. Johnquest
BY
ATTORNEYS

UNITED STATES PATENT OFFICE.

RUDOLPH N. JOHNQUEST, OF ANSONIA, CONNECTICUT.

APPARATUS FOR TESTING THE STRENGTH AND RELATIVE ACTION OF THE EXTRANEOUS MUSCLES OF THE EYES.

SPECIFICATION forming part of Letters Patent No. 686,616, dated November 12, 1901.

Application filed October 12, 1899. Serial No. 733,412. (No model.)

*To all whom it may concern:*

Be it known that I, RUDOLPH N. JOHNQUEST, a citizen of the United States, and a resident of Ansonia, in the county of New Haven and State of Connecticut, have invented a new and Improved Apparatus for Testing the Strength and Relative Action of the Extraneous Muscles of the Eyes, of which the following is a specification.

The subject of my invention is an instrument by which the strength and action of the oculi rectii or extraneous muscles of the eyes can be tested and determined for the purpose of providing the necessary refractive agencies or media to counteract or correct any deficiency or inequality in the action of these muscles.

In the accompanying drawings, Figure 1 represents the instrument in rear elevation, or on the side toward the patient. Fig. 2 is a detail elevation of a supplementary disk or quadrant, the position of which in operation is indicated in Fig. 1. Fig. 3 is a view of the instrument in front elevation, or from the side toward the operator. Fig. 4 is a horizontal section on the line 4 4, Figs. 1 and 3.

A represents an apertured disk pivoted at its center to the projecting extremity of a bridge-piece B, which is mounted on the top of a supporting rod or standard C by a pivot $c$, so that it may be adjusted by a limited rotary or angular movement by means of a worm-gear $d$ for the purpose of setting the instrument accurately in horizontal position when in use.

In the bridge-piece B are two sight-openings $b'$ $b^2$ at a proper distance asunder to be looked through simultaneously by the two eyes of the patient. The first opening $b'$ corresponds with the concentric range of apertures in the disk A in radial distance from the center $a'$ of the said disk, so that by revolving the disk any of the sight-openings therein may be brought in register with the opening $b'$ in bridge-piece B. Each of the concentric range of apertures or sight-openings in the disk A contains a prismatic lens L, which lenses are of graduated strength from one degree to eight degrees, and these prisms are mounted in annular cells or rims $l$, rotatable within the disk A, and are arranged in exact harmony or correspondence radially with respect to the disk, so that the different prismatic lenses brought successively in register with the sight-opening $b'$ exactly correspond in angular position. In the center of the disk A is mounted a cogged disk A', Fig. 3, the teeth on the periphery of which gear with peripheral teeth on the several annular cells $l$, so that by rotating the disk A an equal and simultaneous rotation will be imparted to all the prismatic lenses L for the purpose of adjusting them in angular position, as required, equally and correspondingly. The rotation of the toothed disk A' to thus adjust the prismatic lenses in angular position is effected by a cross-bar $a^2$. Stops $a^3$ are provided to check the rotary movement at given points, so as to arrest and hold the several lenses in the position desired. In practice four such adjustments of the lenses are provided, which I call "bases up," "bases down," "bases in," and "bases out," referring to the position of whichever one of the prismatic lenses is brought into operative position in register with the sight-opening $b'$. As the rotary toothed disk A' is twice the diameter and contains twice the number of teeth of the several rims or rotary cells $l$, it will be apparent that one-half revolution of the toothed disk would effect a complete revolution of the several lens-cells. I accordingly provide, as shown in Fig. 2, a double set of indicating-initials "U," "O," "D," "I," being initials of the words "up," "out," "down," "in," indicating the several positions of the bases of the lenses when in register with the sight-opening, and this angular position of the lenses in the rotating disk to bring them successively in the required position when in register with the sight-opening $b'$ is indicated by a fixed pointer (shown in Fig. 3 in form of an arrow) on the stationary center, around which the annular toothed disk A' revolves, so that the initial letter which is found opposite the pointer indicates the position of the base of whichever of the prismatic lenses is brought in register with the sight-opening.

The sight-opening $b^2$ in the opposite end of the bridge-piece B contains a pair of annular cells $p$, in which are mounted prisms P P', to which relative rotation is imparted by a pinion-shaft $p'$, provided with a milled head for rotating it with the thumb and finger and gearing with teeth on the opposite faces of the annular cells $p$, so that by rotating the prisms relatively to one another the prismatic power may be changed to any point from one-half a degree to ten degrees, and, as shown in Fig. 3, the surrounding rim in which the cells are rotated is provided with a scale which, read in connection with an indicating-mark on the rotating cell $p$, shows with accuracy to half a degree the exact prismatic strength of the combined mobile prisms in any position to which they are adjusted. In Fig. 3 I have shown two such indicating-marks in nearly opposite positions on the rim of the rotating cell in the sight-opening $b^2$, which marks may be used in conjunction with the surrounding scale shown on the fixed frame either singly or conjointly for accurate reading. I further provide the connected prisms P P' and their cells with a common or combined angular adjustment of ninety degrees, which is effected by moving the pinion-shaft $p'$ from horizontal to vertical position, as illustrated in Fig. 1, so that in one position the prisms may be used for testing the movement of the eyes in a horizontal plane and in the other direction for testing the vertical movement.

By the combined use of the compound mobile prisms P P', giving a range of one-half to ten degrees in prismatic power, and the graduated concentric set of prisms L, ranging from one to eight degrees in strength, I provide any prismatic power ranging in one-half degrees from one-half to eighteen degrees in strength for relative test of the eyes with respect to the action of the oculi rectii or extraneous muscles of the eyes, and by the angular adjustment of ninety degrees in either direction I am enabled to apply these tests as required for measuring either horizontal or vertical muscular deviations.

Mounted on the center pivot of the disk A is a quadrant E, having three apertures arranged concentrically or equidistant from the center $a'$, as shown, and containing, respectively, a Maddox rod E', a twelve-degree prism $E^2$, with its base inward, and a Maddox double prism $E^3$. The Maddox rod E' and the double prism $E^3$ are each mounted in rotatable rims or cells with projecting handles $e'$ $e^3$, permitting an angular adjustment of ninety degrees or from horizontal to vertical position, and vice versa.

A single cell F, mounted on the extremity of an arm pivoted at $f$ to the bridge-piece B, contains a plain red glass, which may be brought into register with the sight-opening $b'$ and can be used separately or in conjunction with any of the aforesaid combinations to enable the patient to distinguish between the vision or action of the respective eyes.

$g$ represents a spirit-level employed to indicate the horizontality of the instrument.

This instrument permits the operator to test the strength and relative action of the oculi rectii and to use the ductive system for correcting imperfections therein by the gradual imposition of prismatic powers from one-half degree to thirty degrees in strength on each of the four extrinsic muscles—to wit, superior, inferior, externi, and interni. It also by a handy device permits the diagnosing of ocular deviation by the use of the Maddox rod and the measuring of the same by the prism-batteries to both the right and left of the instrument. The double prism in conjunction with the red glass allows muscular deviation to be diagnosed and in conjunction with the prism-batteries on either side to be correctly computed. The instrument combines every new method of detecting and correcting muscular unbalances, and by means of the auxiliary cogged disk, which rotates the prisms from one degree to eight degrees in strength to any desired position, giving prismatic strength in every axis from zero to one hundred and eighty degrees, ranging from one-half degree to the highest necessary strength.

In using the instrument I seat the patient in front of it, with his left eye looking through the vacant hole in the large disk A and his right eye looking through the duplex mobile prisms P P' at a candle-light about twenty feet distant. I then bring the Maddox rod E' in front of the left eye, so that he will see a red beam of light with the left eye and the white candle-light with the right eye. The mobile prisms P P' being at zero, if the beam of red light seen vertically with the left eye is directly over the white light seen with the right eye there is no muscular unbalance; but if the red beam is to the left or right of the white light it indicates muscular unbalance, and by rotating the prisms P P' before the right eye until the red beam and white light are together the register will show which set of muscles is at fault and the amount of their error. The same results are obtained with reference to the antagonistic vertical muscles by changing the axis of the Maddox rod and bases of the mobile prisms to horizontal position.

The graduated annular series of prisms in the large disk A are for verifying the results of the Maddox rods by neutralizing or increasing their power, as the case may warrant, also for measuring the strength of each of the several rotative muscles—superior, inferior, externi, and interni—so as to determine the character and power of glass needed, and also for enabling application of ductive treatment for reduction of unbalance. Similar results might be obtained by placing the mobile prisms before the left eye, the function of the apparatus being to diagnose the relative action of corresponding or opposed muscles of the eyes.

The double prism $E^3$ is used for the same purpose as the Maddox rod E'. If the double prism be placed in front of the left eye, one sees two lights with the left eye and one light with the right eye. If the three lights seen are equidistant, there is no unbalance; but if one is out of line they can be brought into line by rotation of the mobile prisms, which will register the amount and location of error. Placing the double prism before the right eye and mobile prisms before the left eye will give the same results.

The twelve-degree prism $E^2$ is to enable one to measure the strength of the recti-interni muscles, which in their normal state should overcome twelve or more degrees, and as the annular range of prisms in the disk A extend to only eight degrees it is necessary to place a twelve-degree prism base out before the left eye and add thereto by placing the successive prisms in disk A base out before the same eye, as occasion requires. In measuring the strength of the muscles I place the rotary mobile prisms before the right eye at zero, making them a plano lens. I place a plain red glass before the left eye. The patient will then see a white light tinged with red on one side. If I wish to measure the strength of the external muscle, I adjust the lenses in the large disk A base out and then by turning the disk bring first the one-degree prism before the left eye, and if the patient still sees a single light a two-degree prism is brought down, then three, four, five, six, or eight, until a white and a red light are seen separately. The strongest prism which the muscles will overcome so as to see only one light will be the measure of strength of the externi muscles. The internal recti are supposed to overcome from ten to thirty degrees of prism, the externi from two to eight, and the other muscles in proportion to the work they have to perform. Hence if the externi can overcome only two degrees and the interni overcome twenty there is muscular unbalance. The instrument is designed to ascertain what amount of deviation exists and also to ascertain the strength of each muscle. It combines the power to ascertain what the error is and what is necessary to correct it and also the ability to ascertain the strength of each muscle. Practically the same results would be shown by reversing the instrument, so as to apply the red light to the right eye.

The Maddox rod is an instrument employed by oculists to effect the dissociation of the binocular functions of the eyes. It is made in several forms, all conforming to the same principle of operation. It consists of either a single cylindrical lens or a series of parallel cylindrical rods of glass, the object of which is the distortion of the image of a light, as a candle-flame or gas or electric light or any luminous point, into an elongated strip or band of light, so that when such Maddox rod is placed in front of one eye, both eyes being open, the resulting phenomenon is a different retinal impression in the respective eyes, one eye seeing the light as it actually is, while the eye in front of which the Maddox rod is imposed sees the light in an elongated strip or band. If no muscular unbalance exists, the band and the undistorted image of the light will coincide in position. If unbalance exists, they will be seen at a greater or less distance asunder. The amount of deviation or muscular unbalance is determined by the degree or strength of prism which it is found necessary to apply to one or other of the eyes to bring the band and the undistorted light into conjunction. To test or measure the horizontal muscles—interni and externi—the Maddox rod is imposed in front of one eye in horizontal position, causing it to see a vertical band on one side of the light if unbalance exists. To test or measure the vertical muscles—superior and inferior—the Maddox rod is imposed in vertical position, so as to display a horizontal band, which will appear above or below the image of the light if unbalance exists in the vertical muscles.

The Maddox double prism consists of two prisms placed together base to base, or is more commonly made of a single piece of glass whereon the surfaces of two prisms are ground or two plane surfaces converging in a salient angle or apex, which when placed directly in the center of the visual field of one eye doubles the light as seen by this eye. Simultaneously a red glass is placed in front of the other eye, resulting in the phenomenon of the patient viewing three lights simultaneously where, in fact, only one exists and one of the lights of red color. If perfect muscular balance exists, the red light will appear exactly equidistant between the two normal lights. If unbalance exists, it will be nearer one than the other in the direction of the weaker muscle. To detect horizontal unbalance, the apex of the double prism is placed in vertical position, so as to display the three lights in horizontal range side by side. To detect vertical unbalance, the apex is placed horizontally, so as to display the three lights one above another. In either case the amount of deviation is determined by the strength of prism which it is found necessary to impose in front of the eye looking through the red glass in order to bring the images equidistant.

Novelty is not claimed in the pair of mobile prisms *per se* nor broadly in the use of a rotatable annular series of lenses of graduated strength; but for the purposes of my invention in a comparative test of the extraneous muscles of the eyes, verifying the diagnosis obtained, and for exercising the defective muscles, so as to reduce the unbalance, the elements of the several combinations hereinafter specified in the claims have important and necessary coöperation.

Having thus described my invention, the following is what I claim as new therein and desire to secure by Letters Patent:

1. In an apparatus for testing the strength and relative action of the extraneous muscles of the eyes, the combination of a bridge-piece having two sight-openings, a pair of relatively rotatable mobile prisms mounted in one of the sight-openings and an annular range of prisms of graduated strength mounted on a central pivot and adapted to be brought successively in register with the other sight-opening, as explained.

2. In an apparatus for testing the strength and relative action of the extraneous muscles of the eyes, the combination of a bridge-piece having two sight-openings, an adjustable prismatic lens mounted in one of the sight-openings, an annular range of prisms of graduated strength mounted on a disk pivoted concentrically with the annular range of prisms to permit their successive application to the second sight-opening, and means for effecting the simultaneous and harmonious angular adjustment of the prisms of the annular range to set them base in, base out, base up, or base down, when in register with their sight-opening, as explained.

3. In an apparatus for testing the relative strength and action of the extraneous muscles of the eyes, the combination of a bridge-piece having two sight-openings, a pair of relatively rotating mobile prisms adapted to one of the sight-openings; a concentrically-pivoted annular range of prisms of graduated strength adapted to be brought successively in register with the other sight-opening and a supplementary prism adapted to be superposed in conjunction with any prismatic lens of the annular series, substantially as and for the purposes explained.

4. In an apparatus for testing the strength and relative action of the extraneous muscles of the eyes, the combination of a bridge-piece having two sight-openings an adjustable prismatic lens mounted in one of the sight-openings, a concentric range of prisms of graduated strength rotatable on their common axis so as to be successively imposed in the other sight-opening and a ridge-formed lens rotatable on its own axis to the extent of ninety degrees and mounted in a pivoted frame whereby it may be supported in conjunction with either of the prismatic lenses, for the comparative examination of the eyes, as explained.

5. In an apparatus for testing the strength and relative action of the extraneous muscles of the eyes the combination of a bridge-piece having two sight-openings an adjustable prismatic lens mounted in one of the sight-openings, a concentric range of prisms of graduated strength rotatable on their common axis so as to be successively imposed in the other sight-opening and an angularly-adjustable ridge-formed lens and a colored glass separately mounted in pivoted frames whereby they may be superposed in conjunction with either of the prismatic lenses, for the comparative examination of the eyes, as explained.

RUDOLPH N. JOHNQUEST.

Witnesses:
FRED. A. RUGG,
REUBEN H. TUCKER.